United States Patent
Rajan et al.

(10) Patent No.: US 6,781,405 B2
(45) Date of Patent: Aug. 24, 2004

(54) ADAPTIVE SIGNAL TERMINATION

(75) Inventors: Suresh Rajan, San Jose, CA (US); Scott Best, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 10/135,222

(22) Filed: Apr. 29, 2002

(65) Prior Publication Data

US 2003/0201790 A1 Oct. 30, 2003

(51) Int. Cl.[7] .............................................. H03K 17/16
(52) U.S. Cl. .............................. 326/30; 326/32; 326/33
(58) Field of Search .............................. 326/30–34, 82, 326/83, 86, 90

(56) References Cited

U.S. PATENT DOCUMENTS

| | | | | |
|---|---|---|---|---|
| 4,859,877 A | * | 8/1989 | Cooperman et al. | 307/443 |
| 5,528,168 A | * | 6/1996 | Kleveland | 326/30 |
| 5,726,583 A | * | 3/1998 | Kaplinsky | 326/30 |
| 6,294,924 B1 | | 9/2001 | Ang et al. | |
| 6,331,787 B1 | | 12/2001 | Whitworth et al. | |

OTHER PUBLICATIONS

Bursky, Shhh! Nonlinear Active Termination Quiets Ringing, Electronic Design, Nov. 20, 2000.

* cited by examiner

Primary Examiner—Anh Tran
(74) Attorney, Agent, or Firm—Morgan Lewis & Bockius LLP

(57) ABSTRACT

A system and method of terminating signals are described. In one embodiment, the termination system of the present invention comprises a receiver for receiving a signal from a transmission line, a termination node, a resistive element disposed between the receiver and the termination node, and a termination voltage controller for changing the voltage level of the termination node, in response to the detected signal voltage level. In another embodiment, the present invention includes a method of adaptively terminating a signal. The method of this embodiment comprises detecting the voltage level of a signal, selecting the termination voltage level of a termination node in response to the detected signal voltage level, and terminating the signal, through a resistive element, at the selected termination voltage level.

34 Claims, 14 Drawing Sheets

ADAPTIVE SIGNAL TERMINATION

BACKGROUND OF THE INVENTION

Computer systems typically include devices that communicate using a bus. A bus is one or more signal paths, or transmission lines, that carry signals, from a sending device to a receiving device. Both the sending and receiving devices may be integrated circuits. Buses are also used to carry signal from sending and receiving devices that are located on the same integrated circuit.

The speed and integrity of the transmission of signals over the bus is often of critical importance to the operation of the devices and the overall system. Signal reflection can interfere with the signal transmissions. Signal reflections are created when there are impedance mismatches, or discontinuities in the system. For example, signal reflections can be created when a signal is transmitted over a transmission line that interfaces with a component that has an impedance which differs from the characteristic impedance of the transmission line. Reflected signals are problematic because they can interfere with transmitted signals and affect the integrity of the transmitted signal. One method to deal with this issue is to delay sending or receiving subsequent transmitted signals until the reflections from the previous transmitted signal have subsided. The disadvantage to this approach is that it limits the speed and the efficiency of the devices and the overall system.

Another approach is to employ transmission line terminators. A terminator is a dissipative load, typically a resistor, located at or near the end of a transmission line. Generally, a terminator is selected having an impedance that is matched to the characteristic impedance of the transmission line.

Transmission line termination may be done on or off chip. When "off-chip" termination is used, the signal is terminated by termination circuitry that is located outside of or "off" the integrated circuit receiving the transmitted signal. When "on-chip" termination is employed, the signal is terminated by termination circuitry which is located "on" or within the integrated circuit.

FIG. 1 illustrates an off-chip termination scheme. A first integrated circuit 100, which is also a sending device, transmits a signal through a transmission line 125. A termination circuit 130 is coupled to transmission line 125 near a second integrated circuit 140, which is also a receiving device. Since the termination circuit 130 is outside the second integrated circuit 140, the termination scheme is considered off-chip termination. Since the termination circuit 130 is off-chip and outside the second integrated circuit 140, power associated with the termination of the signal is dissipated by the termination circuit 130 rather than within the second integrated circuit 140. Thus, the power requirements and the performance of second integrated circuit 140 are not affected by the power dissipated within the termination circuit 130.

By the inherent nature of off-chip termination, there is a signal path between the termination circuit 130 and the receiving device 140. The signal path between the termination circuit 130 and the receiving device acts as an impedance discontinuity, or like a secondary transmission line with its own characteristic impedance. This impedance discontinuity can degrade the integrity of the signal received by the receiving device. Accordingly, a solution to reduce or eliminate this so-called secondary transmission line is needed.

An on-chip termination scheme can effectively eliminate the secondary transmission line problem by locating the termination circuitry within the integrated circuit having the receiving device. FIG. 2 illustrates an on-chip termination scheme. First integrated circuit 200, which is also a sending device, transmits a signal through transmission line 225 to termination circuit 230 located within a receiving device on a second integrated circuit 240. Termination circuit 230 is incorporated within the circuitry of the second integrated circuit 240. Since the termination circuit 230 is incorporated within the second integrated circuit 240, signal reflections are minimized thus ensuring a signal having good integrity is available to the receiving device of second integrated circuit 240. Similar to the termination circuit in the off-chip termination scheme, termination circuit 230 is designed to prevent a reflected signal from being sent back to the first integrated circuit 200. Furthermore, because the termination circuit 230 is within the second integrated circuit 240, there is no secondary transmission line. Accordingly, on-chip termination generally allows signal transmission rates to be increased without a decrease in signal integrity due to the effects of the secondary transmission line. As a result, it is usually possible to use a higher signal transmission rate in systems using on-chip termination rather than off-chip termination.

Power dissipation associated with on-chip termination schemes can however, be problematic. When signals are terminated on chip, power is dissipated by the termination circuit within the integrated circuit. Power is dissipated when the voltage level of the incoming signal differs from the voltage level of the termination voltage. The additional power dissipation increases the operating temperature of the integrated circuit. This can cause a reduction in the operating speed and overall performance of the integrated circuit. Furthermore, additional power dissipation in the integrated circuit increases the power supply requirements for the integrated circuit. A termination scheme that has reduced, or is free of, power dissipation and secondary transmission line issues is desirable.

BRIEF DESCRIPTION OF THE DRAWINGS

The present invention is illustrated by way of example and not limitation in the figures of the accompanying drawings, in which like references indicate similar elements and in which.

DESCRIPTION OF THE INVENTION

Various systems and methods are disclosed in the following description, which when taken in conjunction with the accompanying drawings, illustrate, by way of example, the principles of the present invention.

In one embodiment, the present invention includes a method of adaptively terminating a signal. The method of this embodiment comprises detecting the signal voltage level of a signal, selecting the termination voltage level of a termination node in response to the detected signal voltage level, and terminating the signal, through a resistive element, at the selected termination voltage level. In one preferred embodiment, the termination voltage level is selected to match, or substantially match, the detected signal voltage level. In another preferred embodiment, the termination voltage level is selected to provide a voltage that minimizes the transmission current, or more preferable reduces the transmission current of a transmission line to zero. As used herein the term termination node is used to refer to a location in a circuit where a termination voltage may be applied or where it may be measured. As used herein the term "transmission current" refers to the current that a transmitter or sending device drives into a transmission line to affect the signal voltage level of that line.

Figure 1:
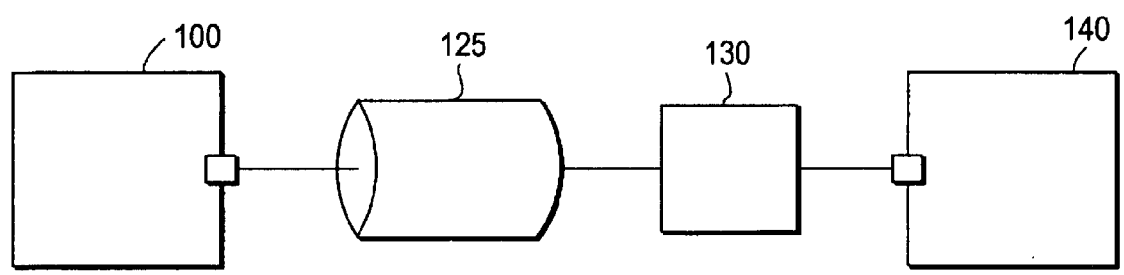
FIG. 1 is a simplified circuit diagram of a prior art system showing off-chip termination.
Figure 2:
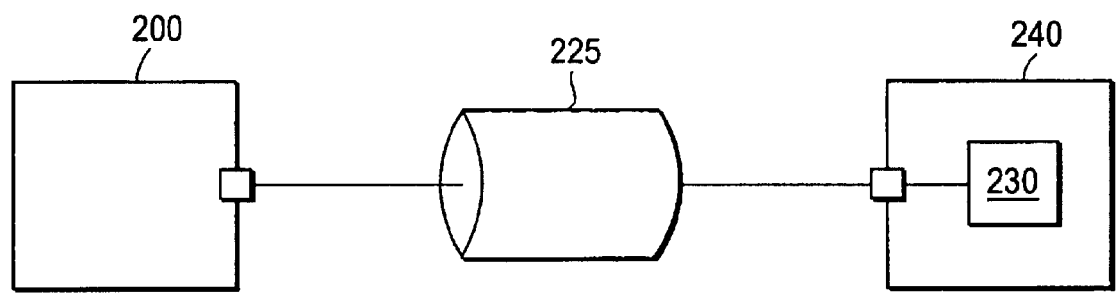
FIG. 2 is a simplified circuit diagram of a prior art system showing on-chip termination.
Figure 3A:
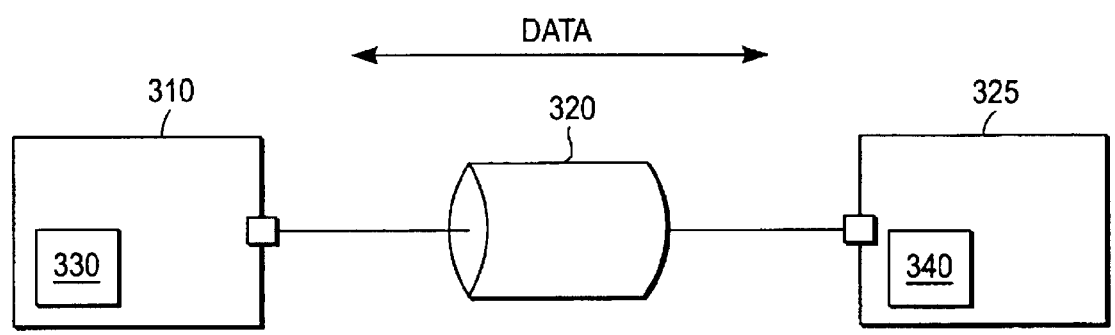
FIG. 3A is a simplified block diagram of one embodiment of a termination system according to the invention.

FIG. 3A illustrates a simplified system for data transmission using an "on-chip" termination system embodiment of the present invention. A transmission line 320 is coupled between a first integrated circuit 310 and a second integrated circuit 325. A first termination circuit 330 is contained within first integrated circuit 310 and a second termination circuit 340 is contained within second integrated circuit 325. Although first and second termination circuits 330 and 340 may be the same or different, at least one of the termination circuits is capable of terminating signals transmitted on transmission line 320 using an adaptive termination scheme where the voltage level of the termination voltage is adjusted. In preferred embodiments, the termination voltage level is adjusted to match, or substantially match, the voltage level of each signal as such signal is terminated. In certain preferred embodiments, both the first termination circuit 330 and the second termination circuit 340 use adaptive termination. In another preferred embodiment, the transmission line 320 is a bus comprising a plurality of transmission lines. The bus is preferably capable of simultaneously carrying multiple signals between first integrated circuit 310 and second integrated circuit 325, and both 310 and 325 have one or more termination circuits that are capable of adaptively terminating such simultaneously transmitted signals.

In one preferred embodiment of the data transmission scheme of FIG. 3A, first integrated circuit 310 is a CPU (central processing unit, such as for example a Pentium® IV processor) and second integrated circuit 325 is a memory controller. In another preferred embodiment, first integrated circuit 310 includes a memory controller, and second integrated circuit 325 is a memory device, such as a SDRAM (Synchronous Dynamic Random Access Memory), DDR (Double Data Rate) SDRAM, RDRAM® device, SRAM (Static Random Access Memory), and the like. In certain preferred embodiments, both the first integrated circuit 310 and the second integrated circuit 325 are capable of both transmitting and receiving signals.

Figure 3B:
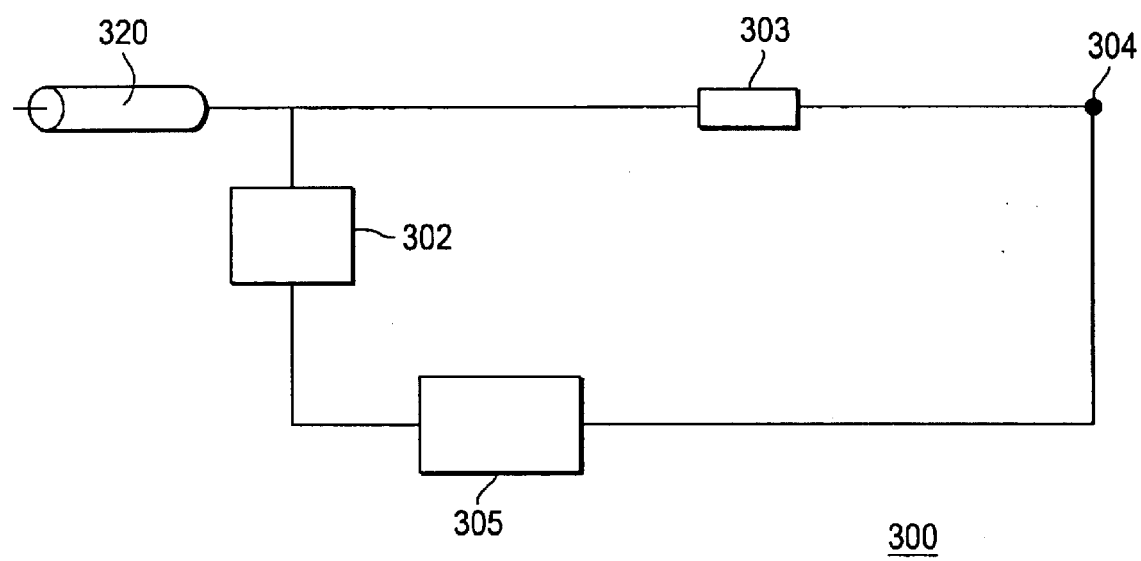
FIG. 3B is a simplified block diagram of another embodiment of a termination system according to the invention.

A termination system according to another embodiment of the present invention is depicted in FIG. 3B. Termination system 300 includes a resistive element 303 coupled to transmission line 320 and a termination node 304. As depicted in FIG. 3B, receiver 302 is also coupled to a transmission line 320. The receiver is for detecting the voltage level of a signal transmitted on the transmission line 320. Termination system 300 also includes termination voltage controller 305. Termination voltage controller 305, acting in response to the signal voltage level detected by receiver 302, controls the termination voltage used by the resistive element 303 to terminate the signal. The voltage level of the termination node is changed from a first termination voltage level at a first time to a second termination voltage level at a second time. Although resistive element 303 and termination voltage controller 305 are depicted as two separate elements, the resistive element and the termination voltage controller may be combined in a single component capable of providing both the functions.

The termination system of the present invention may be used to reduce the power needed to terminate an input signal. When the power needed to terminate signals is reduced, the power supply requirement of the system can be reduced and unwanted heat generation can be reduced. The signal being transmitted on transmission line 320 may represent a series of bits of information for use by an IC or device having receiver 302. The termination system of the present invention may be used to detect the voltage level of the first bit of the series and adjust the termination voltage at the termination node, preferably such that it matches, or substantially matches, the detected voltage level of the first bit. Alternatively, the termination system of the present invention may be used to detect the logic value associated with the voltage level of the first bit of the series and adjust the termination voltage at the termination node, preferably such that it matches the voltage level associated with the logic value of the first bit. In one embodiment, the voltage level of the termination node is adjusted to match the voltage level of the first bit. If the voltage level of the second bit matches, or substantially matches, the voltage level of the first bit, then the voltage level of the termination node is not adjusted. However, if the voltage level of the second bit is different, or substantially different, from the voltage level of the first bit, the voltage level of the termination node is adjusted, preferably to match, or substantially match, the voltage level of the second bit. In a preferred embodiment, changes in the voltage level of the termination node are made after the signal or bit is detected by receiver 302 and the associated logic value of such bit is determined. In one preferred embodiment of the present invention, receiver 302, resistive element 303, termination node 304 and termination voltage controller 305 all reside on a single integrated circuit. In an alternate embodiment, the resistive element 303 and receiver 302 reside on different integrated circuits. The termination system of FIG. 3B may be implement using active devices, passive devices, or combinations thereof. Rather than operating to detect the voltage level of a bit, the termination system of the present invention may be used to detect the logic level associated with the voltage level of a bit and adjust the termination voltage level at the termination node. In preferred embodiments, the termination voltage is adjusted to match, or substantially match, the voltage level associated with the detected logic level of the first bit.

In an alternative embodiment, and as described in more detail below, termination node 304 of FIG. 3B may be replaced by a first termination node which is maintained at a first termination voltage and a second termination node which is maintained at a second termination voltage. The first termination voltage preferably matches, or substantially matches the signal voltage level which represents a logic "1" and the second termination voltage matches, or substantially matches the signal voltage level which represents a logic "0". In this embodiment, the termination voltage controller functions to cause the transmission line to be coupled to the first termination node, through the resistive element, when the signal voltage level detected by the termination voltage controller represents a logic "high" or "1" and to be coupled to the second termination node, through the resistive element, when the signal voltage level detected by the termination voltage controller represents a logic "low" or "0". In yet another alternative embodiment, the resistive element 303 may be replaced by a first resistive element coupled between the receiver 302 and the first termination node and a second resistive element coupled between the receiver 302 and the second termination node.

Instead of steadily using power as each successive bit is received and terminated, the majority of the power consumed by the termination system of the present embodiment is consumed when there is a transition between successive signals, or successive bits, from a first logic value to a second, different logic value. For example, after an initial signal having a logical "1" or high value is received and terminated, the process of terminating each successive "high" signal received consumes very small amounts of power until a signal is received that has a logical "0" or low value. Similarly, after an initial signal having a logical low value is received and terminated, the termination of each successive low signal which is received "in a row" consumes very small amounts of power until a signal is received having a high logic value.

In a preferred embodiment, resistive element 303 is a resistor and its impedance is selected to match, or substantially match, the characteristic impedance of the transmission line. This helps to insure the integrity of the signal at receiver 302.

The termination system of FIG. 3B may be used to reduce or minimize the power required to terminate a plurality of signals which are serially transmitted on a transmission line. The termination system of the present invention may be used to detect the voltage level of the first transmitted signal and based on such signal voltage level, select a first desired termination voltage level. If the termination node is not already at the first desired termination voltage level, the termination system may be used to change the voltage level of the termination node to the first desired termination voltage level. In preferred embodiments, the first desired termination voltage level matches, or at least approximates, the voltage level of the first transmitted signal such that, as the first signal is terminated at the resistive element, the difference between the voltage level at the resistive element and the voltage level at the termination node is minimized, or more preferably, is eliminated. When the second, or subsequent signal, is transmitted on the transmission line, the termination system of the present invention may be used to detect its signal voltage level (i.e. the second signal voltage level) and select a termination voltage level (i.e. the second termination voltage level) which matches, or at least approximates the second signal voltage level.

In a binary systems, a signal received by receiver 302 may represent either a logic "1" or "0". For example, the logic "1" may be represented by a high voltage level and the logic "0" may be represented by a low voltage level. Although the high and low voltage levels may be any levels appropriate for the specific application, for example purposes, we use a high voltage level of 1.8 volts and a low voltage level of zero volts. If a first signal being transmitted on transmission line 320 is representative of a logic "1", the voltage level of such signal will be approximately 1.8 volts. The receiver 302 will detect this voltage level and the termination voltage controller 305 will cause the voltage level at the termination node 304 to be 1.8 volts as the first signal is terminated at resistive element 303. If the next signal, i.e. the second signal, being transmitted represents a logic "1", the voltage level at the termination node will not need to be changed. If the next signal, i.e., the third signal represents a logic "0", the termination voltage controller will need to cause the voltage level at the termination node to be changed such that the termination node voltage level, when the third signal travels through the resistive element, is at or near zero volts. In preferred binary embodiments, the termination voltage controller is capable of selecting one of two voltage levels to apply to the termination node, in response the voltage level of the signal.

The present invention may also be implemented in a multilevel signaling system wherein the signal voltage level is one of N levels. In preferred multilevel embodiments, the termination voltage controller is capable of selecting one of N termination voltage levels to apply to the termination node, in response to the voltage level of the signal, where each of the N termination voltage levels matches, or at least approximates, one of the N signal voltage levels.

Figure 3C:
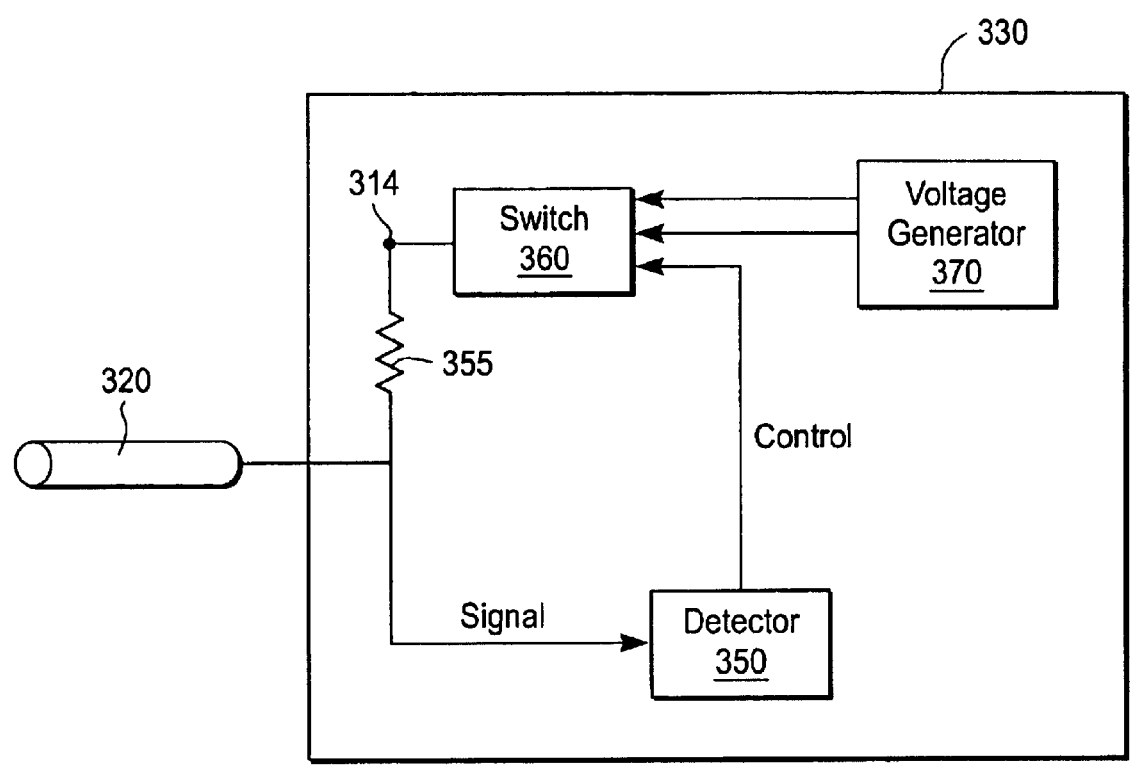
FIG. 3C is a simplified circuit diagram of another embodiment of a termination system according to the invention.

FIG. 3C illustrates a simplified block diagram of a termination circuit that can be used as first termination circuit 330. The simplified block diagram of the termination circuit 330 is shown for exemplary purposes and can be identical to the termination circuit 340 of FIG. 3A. A detector 350 is coupled to a switch 360. The switch 360 is coupled to the voltage generation block 370 which supplies the termination voltage for terminating the input signal. In the embodiment depicted in FIG. 3C, voltage generation block 370 is configured to supply at least two different voltage levels for use by switch block 360. The switch 360 is coupled to a termination node 314 which is coupled to a first terminal of a resistor 355. The second terminal of the resistor 355 is coupled to the transmission line 320 and the detector 350. In another embodiment, the switch 360 and the voltage generation block 370 may be combined together to form a termination voltage controller 305.

In use, a signal is received by the detector 350 from the transmission line 320. The detector 350 determines the voltage level of the signal and instructs the switch 360 to select the appropriate voltage level for the termination voltage. The selected voltage level for the termination voltage is supplied by the voltage generation block 370 to the switch 360. Switch 360 operates to apply the selected termination voltage to termination node 314.

Figure 4:
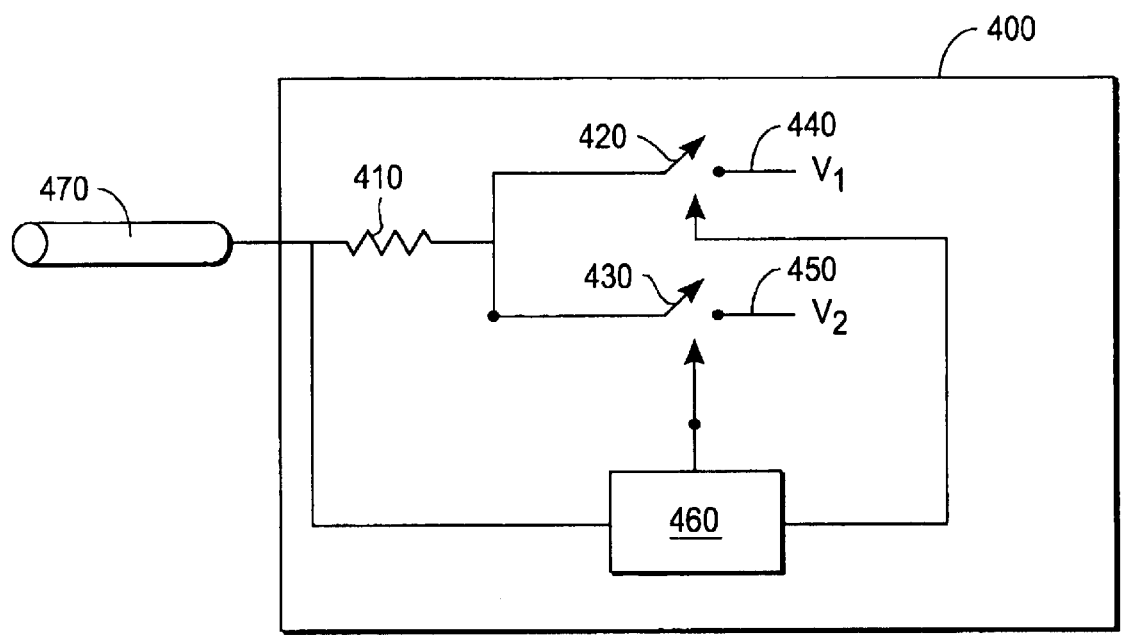
FIG. 4 is a simplified circuit diagram of another embodiment of a termination system according to the invention.

FIG. 4 illustrates one embodiment of a simplified termination circuit 400. The termination circuit 400 includes a resistor 410, a first switch 420, a second switch 430, a first termination node 440 biased at a first termination voltage having a voltage level $V_1$, a second termination node 450 biased at a second termination voltage having a voltage level $V_2$, and a termination voltage controller 460, also called detector switch control 460. The termination circuit 400 is coupled to a transmission line 470. A first terminal of the resistor 410 is coupled to the transmission line 470 and an input terminal of the detector switch control 460. A second terminal of the resistor 410 is coupled to a first terminal of the first switch 420 and a first terminal of the second switch 430. A second terminal of the first switch 420 is coupled to the first termination node 440. A second terminal of the second switch 430 is coupled to the second termination node 450. An output terminal of the detector switch control 460 is coupled to a control terminal of the first switch 420 and a control terminal of the second switch 430. The detector switch control 460 detects the voltage level of an incoming signal from transmission line 470 and sends one or more control signals so that one of switches 420 and 430 is open and the other is closed.

For the sake of simplicity, the termination circuit 400 depicted in FIG. 4 utilizes two voltages ($V_1$ and $V_2$) and two corresponding switches (first switch 420 and second switch 430). Because of this configuration, the termination circuit is configured to receive a signal having one of two states. One of those states is where the signal has a voltage level that is closer to, or more preferably matches, the voltage level of $V_1$ and the other is where the signal has a voltage level that is closer to, or more preferably matches, the voltage level of $V_2$. In another embodiment, the termination circuit 400 can adaptively terminate signals having one of N states by incorporating N termination voltage levels and N corresponding switches. In one exemplary use, a signal is received by the termination circuit 400 through the transmission line 470. Initially, one of switches 420 and 430 is open and the other closed. The received signal is sensed by the detector switch control 460. Based on the detected voltage level of the signal, the detector switch control 460 instructs either the first switch 420 or the second switch 430 to close. Ideally, if the received signal is at or near voltage level $V_1$, the detector switch control 460 would instruct the first switch 420 to close (and the second switch 430 to open). Once first switch 420 is closed, there is little or no power dissipated in the resistor 410 since both terminals of resistor 410 are at (or near) voltage $V_1$. Likewise, if the detected voltage level of the received signal is at or near voltage $V_2$, the detector switch control 460 would instruct the second switch 430 to close (and switch 420 to open). Once second switch 430 is closed, there is little or no power dissipated in the resistor 410 since both terminals of resistor 410 are at (or near) voltage $V_2$. In both cases, by closing either the first switch 420 or the second switch 430, adaptive termination is accomplished by selectively terminating at a desired voltage. In preferred embodiments, the resistor 410 has an impedance which matches the characteristic impedance of the transmission line 420. In one preferred embodiment, in order to reduce power dissipation in resistor 410, the voltage levels of $V_1$ and $V_2$ are selected to match the voltage levels of the received signal. If the voltage levels of the received signals do not exactly match the voltage levels associated with the logic values of the system, in one embodiment, the voltage levels of $V_1$ and $V_2$ may be selected to match the voltage levels associated with the logic values of the system.

Figure 5:
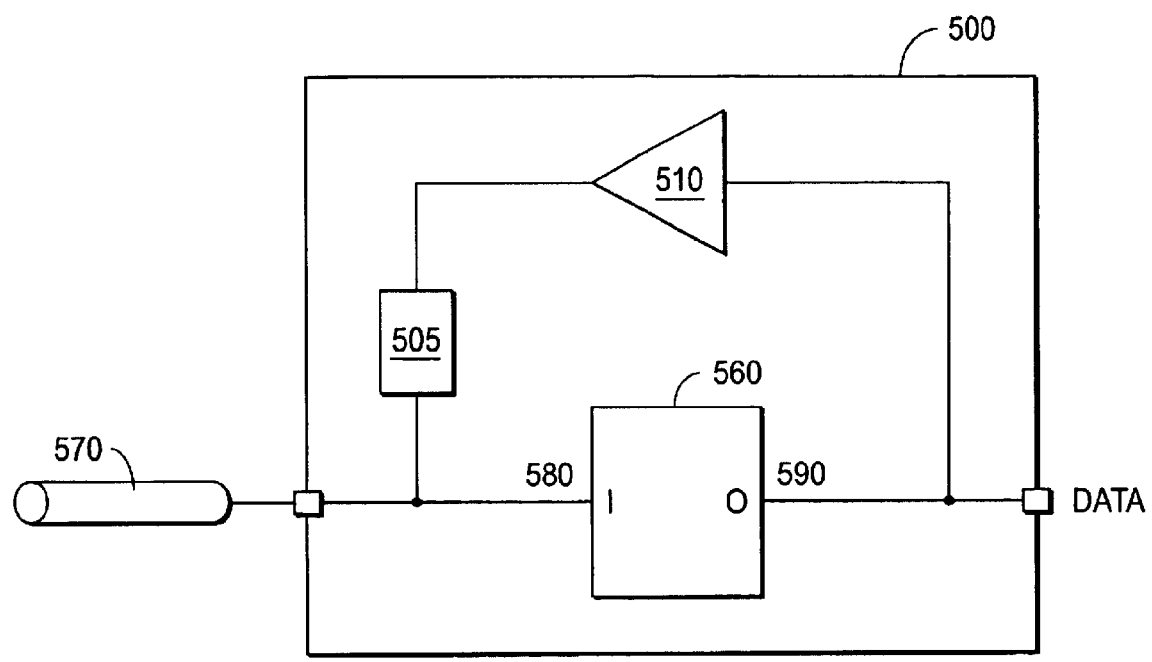
FIG. 5 is a simplified circuit diagram of another embodiment of a termination system according to the invention.

FIG. 5 illustrates one embodiment of a simplified termination circuit 500. The simplified termination circuit 500 includes a dissipative load 505, a driver 510, and an input sampler 560. The simplified termination circuit 500 is coupled to a transmission line 570. The transmission line 570 is coupled to a first terminal of the dissipative load and an input terminal 580 of the input sampler 560. An input terminal of the driver 510 is coupled to an output terminal 590 of the input sampler 560. A second terminal of the dissipative load 505 is coupled to an output terminal of the driver 510. The driver 510 drives the signal from the output terminal 590 onto the output terminal of the driver 510. In some embodiments, the signaling levels at the input terminal of the driver 510 may be different from the signaling levels at the output terminal of the driver 510. For example, the driver 510 may be designed to translate from one signaling level to another signaling level. In preferred embodiments, dissipative load 505 is a resistor. In certain preferred embodiments, the combined impedance of the driver 510 and dissipative load 505 is chosen to match the characteristic impedance of transmission line 570. In certain other preferred embodiments, driver 510 is a voltage mode output driver, preferably with impedance control. Although driver 510 and dissipative load 505 are shown as separate elements, driver 510 and load 505 may be combined in a single element.

When receiving a signal on the input terminal 580 from the transmission line 570, the input sampler 560 senses the voltage level of the signal. Based on the voltage level of the signal at the input terminal 580, the input sampler 560 generates an output signal on the output terminal 590. The driver 510 drives a termination voltage on its output terminal, the voltage level of such termination voltage is dependent upon the output signal 590.

Figure 6:
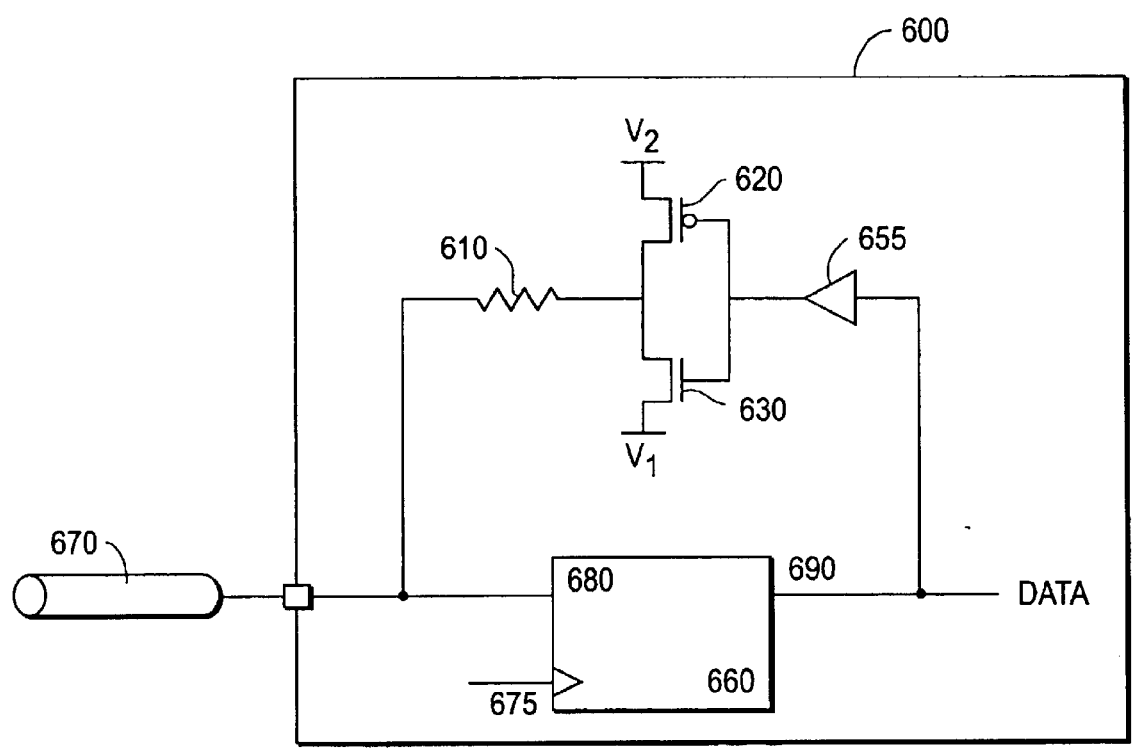
FIG. 6 is a simplified circuit diagram of another embodiment of a termination system according to the invention.

FIG. 6 illustrates one embodiment of a simplified termination circuit 600. The simplified termination circuit 600 includes a resistor 610, a first transistor 620, a second transistor 630, an inverter 655, and an input sampler 660. The simplified termination circuit 600 is coupled to a transmission line 670. The transmission line 670 is coupled to a first terminal of the resistor 610 and an input terminal 680 of the input sampler 660. An input terminal of the inverter 655 is coupled to an output terminal 690 of the input sampler 660. An output terminal of the inverter 655 is coupled to a gate terminal of first transistor 620 and a gate terminal of second transistor 630. A source terminal of first transistor 620 is coupled to second termination voltage node which is at voltage level $V_2$. A drain terminal of first transistor 620 is coupled to a drain terminal of second transistor 630 and a second terminal of the resistor 610. A source terminal of second transistor 630 is coupled to first termination voltage node which is at voltage level $V_1$. A clk terminal 675 of the input sampler 660 receives a clock signal for latching an output data signal on the output terminal 690. Although he first transistor 620 is preferably a PMOS transistor, and second transistor 630 is preferably a NMOS transistor, a person of ordinary skill in the art will recognized that transistors 620 and 630 may be substituted with devices manufactured in other semiconductor processing technologies such as, for example, bipolar processing.

When receiving a signal on the input terminal 680 from the transmission line 670, the input sampler 660 senses the signal. Based on the voltage level of the signal at the input terminal 680 and upon receiving the clock signal on the clk terminal 675, the input sampler 660 generates an output signal on the output terminal 690. Based on the output signal, either first transistor 620 or second transistor 630 is activated in order to selectively couple the resistor to either the first termination node (which is maintained at voltage level $V_1$) or the second termination voltage node (which is maintained at voltage level $V_2$). The input signal is terminated at resistor 610, using a termination voltage whose level was selected based on the voltage level of the input signal. In a preferred embodiment, resistor 610 is selected to have an impedance which matches the characteristic impedance of the transmission line 670. In other preferred embodiments, the value of resistor 610 is chosen such that the combined impedance of resistor 610 and the on-resistance of transistor 620 (and/or the combined impedance of resistor 610 and the on-resistance of transistor 630) is matched to the characteristic impedance of the transmission line 670.

Figure 7:
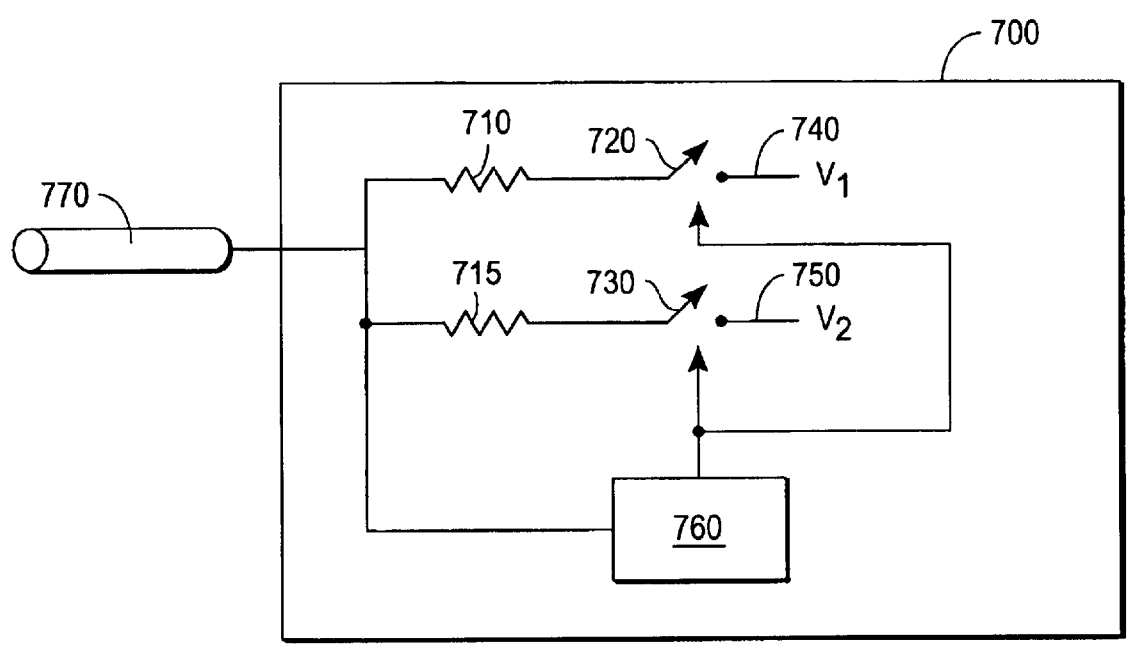
FIG. 7 is a simplified circuit diagram of another embodiment of a termination system according to the invention.

FIG. 7 illustrates one embodiment of a simplified termination circuit 700. The termination circuit 700 includes a first resistor 710, a second resistor 715, a first switch 720, a second switch 730, a first termination node 740 which is biased at a first termination voltage having a voltage level $V_1$, a second termination node 750 which is biased at a second termination voltage having a voltage level $V_2$, and a termination voltage controller 760, also referred to as detector switch control 760. The termination circuit 700 is coupled to a transmission line 770. A first terminal of first resistor 710 is coupled to the transmission line 770, a first terminal of second resistor 715, and an input terminal of the detector switch control 760. A second terminal of first resistor 710 is coupled to a first terminal of the first switch 720. A second terminal of second resistor 715 is coupled to a first terminal of the second switch 730. A second terminal of the first switch 720 is coupled to the first termination node 740. A second terminal of the second switch 730 is coupled to the second termination node 750. An output terminal of the detector switch control 760 is coupled to a control terminal of the first switch 720 and a control terminal of the second switch 730.

Preferably, resistors 710 and 715 are selected so that their impedances match the characteristic impedance of the transmission line 770. For the sake of simplicity, the termination circuit 700 of FIG. 7 is depicted as utilizing two voltages termination voltage levels ($V_1$ and $V_2$), two corresponding resistors (resistors 710 and 715), and two corresponding switches (switches 720 and 730). Because of this configuration, the termination circuit is configured to receive binary signals (i.e. signals having one of two states). In another embodiment, the termination circuit 700 can be configured to receive and terminate multilevel signals having N states by incorporating N termination voltage levels, N resistors, and N corresponding switches.

In an exemplary use, a signal is received by the termination circuit through the transmission line 770. Initially, one of the switches 720 and 730 is closed (and the other is open). The signal is sensed by the detector switch control 760. Based on the signal, the detector switch control 760 instructs one of the first and second switches to close. Ideally, if the received signal is at voltage $V_1$, the detector switch control 760 would instruct the first switch 720 to close and the second switch 730 to open. Likewise, if the received signal is at voltage $V_2$, the detector switch control 760 would instruct switch 730 to close (and switch 720 to open). In both cases, by closing either the first switch 720 or the second switch 730, termination is accomplished by selectively terminating at a desired voltage.

Figure 8:
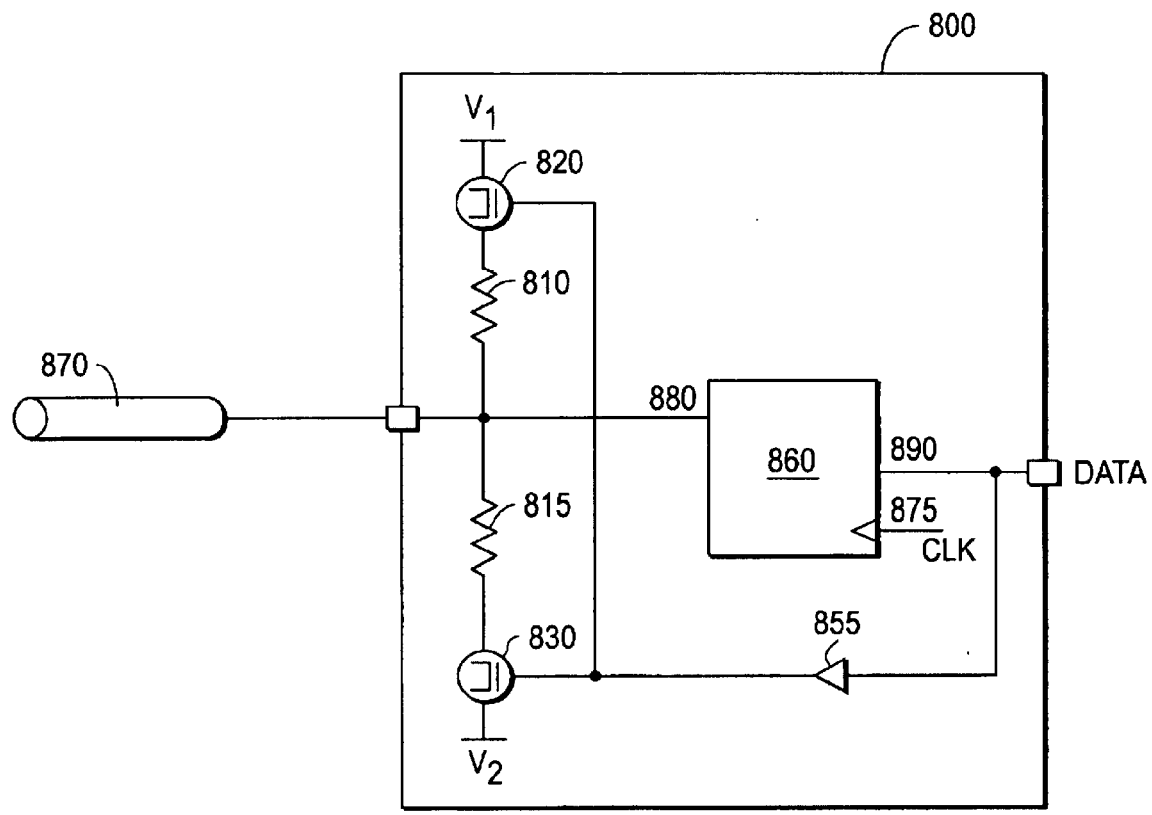
FIG. 8 is a simplified circuit diagram of another embodiment of a termination system according to the invention.

FIG. 8 illustrates one embodiment of a simplified termination circuit 800. The simplified termination circuit 800 includes a first resistor 810, a second resistor 815, a first transistor 820 (which corresponds to the first switch 720 of FIG. 7), a second transistor 830 (which corresponds to the second switch 730 of FIG. 7), an inverter 855, and an input sampler 860. The simplified termination circuit 800 is coupled to a transmission line 870. The transmission line 870 is coupled to a first terminal of first resistor 810, a first terminal of second resistor 815, and an input terminal 880 of the input sampler 860. An input terminal of the inverter 855 is coupled to an output terminal 890 of the input sampler 860. An output terminal of the inverter 855 is coupled to a gate terminal of first transistor 820 and a gate terminal of second transistor 830. A source terminal of first transistor 820 is coupled to a first termination node which is biased at a first termination voltage having voltage level $V_1$. A drain terminal of first transistor 820 is coupled to a second terminal of first resistor 810. A drain terminal of second transistor 830 is coupled to a second terminal of second resistor 815. A source terminal of second transistor 830 is coupled to a second termination node which is biased at a second termination voltage having a voltage level $V_2$. A clk terminal 875 of the input sampler 860 receives a clock signal for latching an output data signal on the output terminal 890. First transistor 820 is preferably a PMOS transistor, and second transistor 830 is preferably an NMOS transistor.

When receiving a signal on the input terminal 880 from the transmission line 870, the input sampler 860 senses the signal. Based on the voltage level of the signal at the input terminal 880 and upon receiving the clock signal on the clk terminal 875, the input sampler 860 generates an output signal on the output terminal 890. Based on the output signal, either first transistor 820 or second transistor 830 is activated. If first transistor 820 is activated by input sampler 860 and the detected voltage level of the signal from transmission line 870 is substantially similar to the first termination voltage (which is at voltage level $V_1$) then little, or more preferably no, current flows through first resistor 810 and little, or more preferably no, power is dissipated. In a preferred embodiment, the combined impedance of first resistor 810 and the on-resistance of first transistor 820 is chosen to match the characteristic impedance of the transmission line 870. If second transistor 830 is activated by the input sampler 860 and the detected voltage level of the signal from transmission line 870 is substantially similar to the second termination voltage (which is at voltage level $V_2$), then little, or preferably no, current flows and little, preferably no, power is dissipated. In one preferred embodiment, the combined impedance of second resistor 815 and the on-resistance of second transistor 830 is chosen to match the characteristic impedance of the transmission line 870.

In another embodiment, first transistor 820 and first resistor 810 may be replaced by a transistor circuit. The transistor circuit may be specifically calibrated to have an impedance which matches the characteristic impedance of the transmission line 870. Likewise, second transistor 830 and second resistor 815 may be replaced by a transistor circuit, which may be specifically calibrated to match the characteristic impedance of the transmission line 870.

Figure 9A:
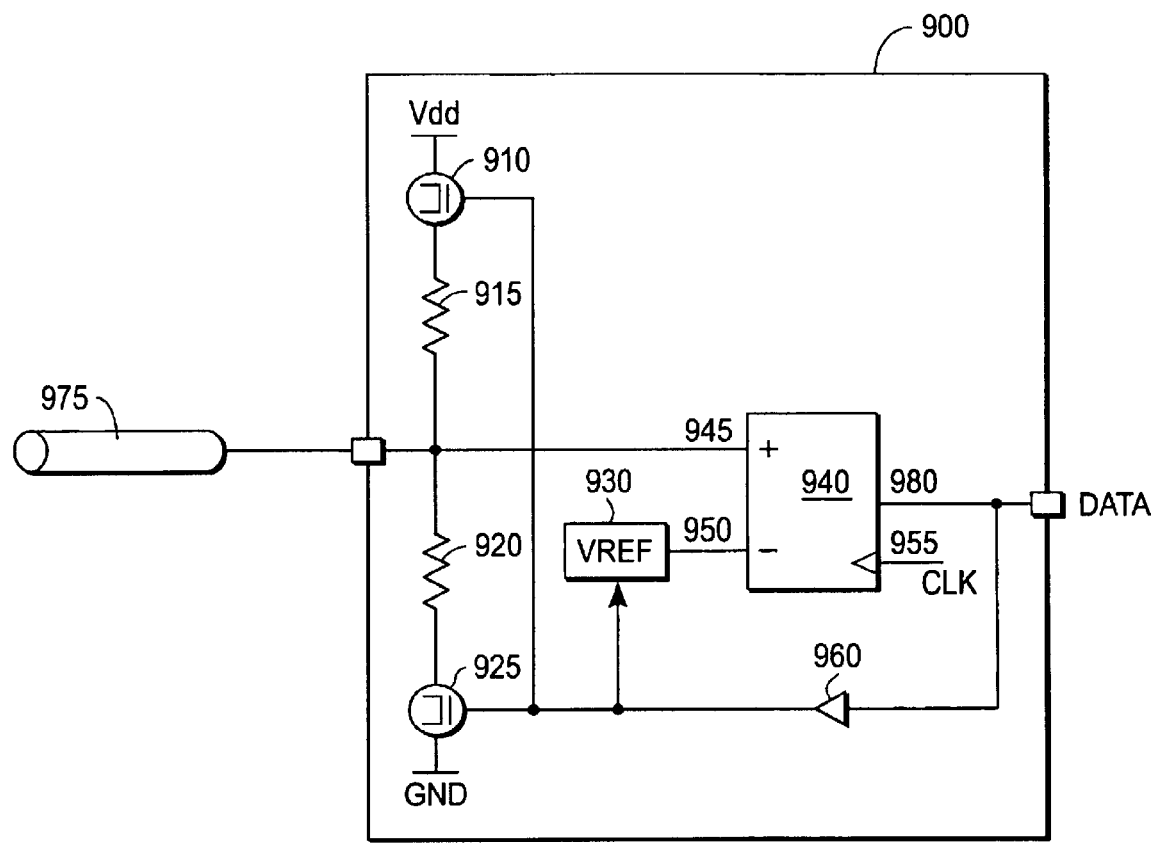
FIG. 9A is a simplified circuit diagram of another embodiment of a termination system according to the invention.

FIG. 9A illustrates a preferred embodiment of a termination circuit 900. The termination circuit 900 is coupled to a transmission line 975 and is configured to terminate a signal from the transmission line 975. The termination circuit 900 includes a first transistor 910; a first resistor 915; a second resistor 920; a second transistor 925; a reference voltage (VREF) module 930; an input sampler 940 including a positive terminal 945, a negative terminal 950, a clk terminal 955, and an output terminal 980; and an inverter 960.

A source terminal of first transistor 910 is coupled to Vdd. When termination circuit 900 is disposed on an integrated circuit, Vdd may the supply voltage for the integrated circuit. In one preferred embodiment, Vdd is preferably 2.5 volts and ground is preferably zero volts. In other embodiments, Vdd and ground can be a wide range of voltage levels. A drain terminal of first transistor 910 is coupled to a first terminal of first resistor 915. A second terminal of first resistor 915 is coupled to a first terminal of second resistor 920, the transmission line 975, and the positive terminal 945. A second terminal of second resistor 920 is coupled to a drain terminal of second transistor 925. A source terminal of second transistor 925 is coupled to ground. A gate terminal of second transistor 925 is coupled to a first terminal of the VREF module 930, a gate terminal of first transistor 910, and an output terminal of the inverter 960. The output terminal 980 is coupled to an input terminal of the inverter 960. A second terminal of the VREF module 930 is coupled to the negative terminal 950. The clk terminal 955 is configured to receive a clock signal. First transistor 910 is preferably a PMOS transistor, and second transistor 925 is preferably an NMOS transistor.

In one embodiment, the VREF module 930 is configured to receive an input from the output terminal of the inverter 960 which in turn is based on an output signal generated by the output terminal 980 of the input sampler 940. Based on this output signal of the terminal 980, the VREF module 930 preferably supplies the negative terminal 950 with a reference voltage of ¼ Vdd or ¾ Vdd. For example, when Vdd is equal to 2.5 volts, ¼ Vdd is equal to 625 millivolts, and ¾ Vdd is equal to 1.875 volts. In other embodiments, different reference voltages can be used either greater or less than ¼ Vdd and ¾ Vdd without departing from the scope of this invention.

The reference voltage that is supplied by the VREF module 930 is dependent on the output signal from the input sampler 940. In one embodiment, the reference voltage is preferably set at ¼ Vdd (625 millivolts) by the VREF module 930 when the output signal from the input sampler 940 is a "0". The reference voltage is preferably set at ¾ Vdd (1.875 volts) by the VREF module 930 when the output signal from the input sampler 940 is a "1".

In one embodiment, the input sampler 940 compares the input signal on the positive terminal 945 to the reference voltage received on the negative terminal 950. The input sampler 940 generates the output signal in response to this comparison, and upon receiving a clock signal. This output signal is either a "1" or "0" in response to the input signal and the reference voltage. For example, a "1" is provided at the output terminal 980 when the input signal on the positive terminal 945 is more positive than the reference voltage on the terminal 950 and a "0" is provided at the output terminal 980 when the input signal on the positive terminal 945 is less positive than the reference voltage on the negative terminal 950.

In use, the input signal is received from the transmission line 975. Prior to receiving the input signal, the positive terminal 945 is at either Vdd or ground, depending on the state of the transistors 910 and 925. The input sampler 940 monitors the input signal through the positive terminal 945. Additionally, the input sampler 940 compares the input signal with respect to the reference voltage supplied by the VREF module 930 through the negative terminal 950. When an edge of the clock signal is received by the clk terminal 955, the input sampler 940 generates either a "1" or "0" on the output terminal 980 depending on whether the input signal was more positive or less positive relative to the reference voltage when the input sampler 940 was comparing the input signal with the reference voltage. In response to the value of the output terminal 980, VREF module 930 selects an appropriate reference voltage. Output signal 980 operates to control transistors 910 and 925, and thereby control the termination voltage level. In one embodiment, when output signal 980 has a logic value of "high", it causes transistor 910 to turn on and transistor 925 to turn off, thereby changing the termination voltage level of the termination node to the voltage level of Vdd.

Figure 9B:
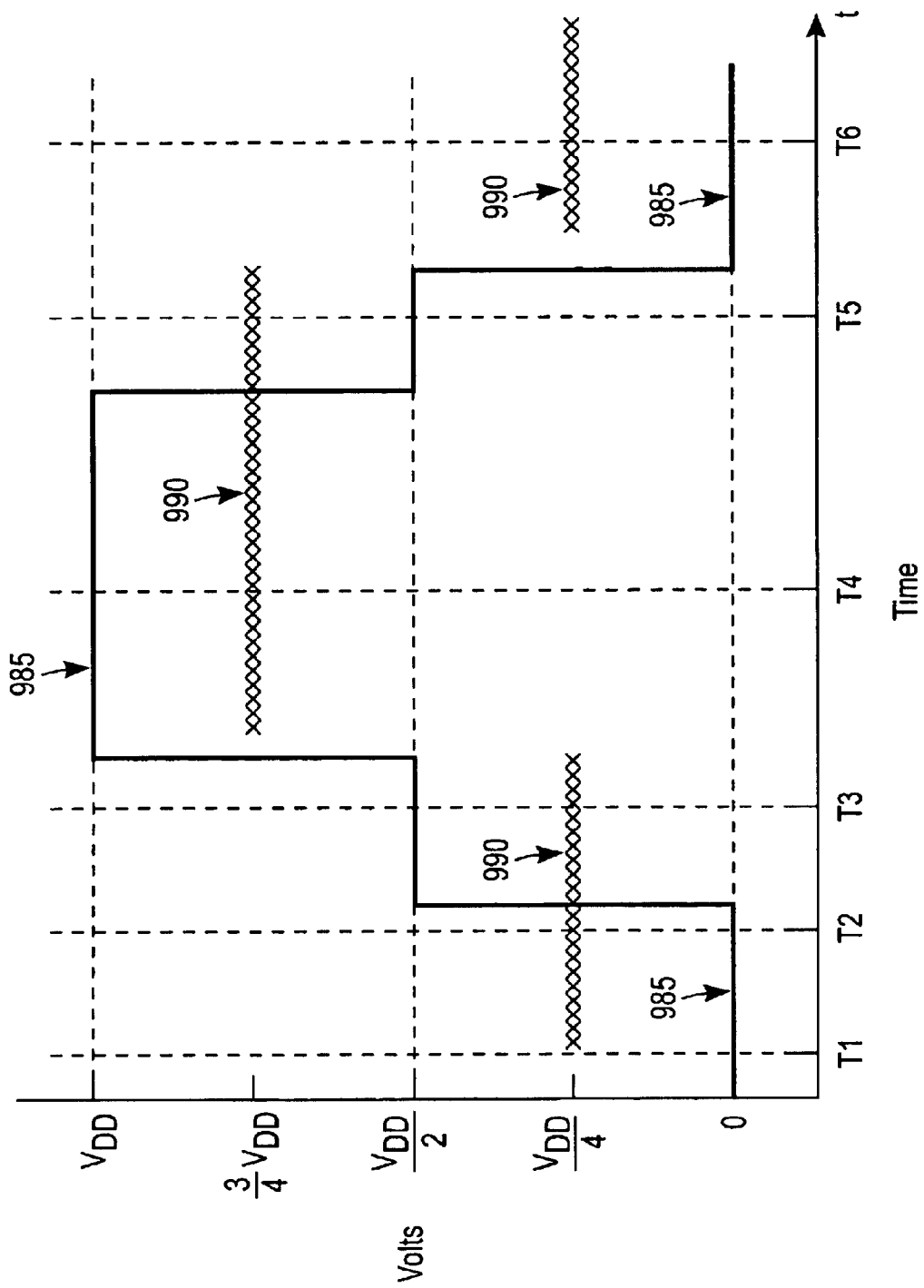
FIG. 9B is a timing diagram illustrating the operation of the circuit diagram shown in FIG. 9A.

FIG. 9B illustrates an ideal exemplary waveform pattern which corresponds to the operation of the termination circuit 900. This exemplary waveform is shown to better illustrate the invention and is not meant to show exact timing or voltage values and is not meant to limit the scope of the invention. Input signal 985 represents the voltage at the positive terminal 945. Reference voltage signal 990 represents the reference voltage produced by the VREF module 930. Prior to time T1, the input signal 985 and the output terminal 980 of the input sampler 940 are at "0". Between times T1 and T2 and in response to the "0" at the output terminal 980, first transistor 910 is inactive (non-conducting), and second transistor 925 is active (conducting.) In response to the "0" at the output terminal 980, the VREF module 930 selects ¼ Vdd as the reference voltage as shown by the reference voltage signal 990.

Between times T2 and T3, a voltage greater than ground, signifying a possible high data signal, is received by the positive terminal 945. First transistor 910 is still inactive, and second transistor 925 is still active. Thus, the current flows from the positive terminal 945 through second resistor 920 and second transistor 925 to ground. This raises the voltage at the positive terminal 945 from ground to ½ Vdd as shown by the input signal 985. At time T3, the clock signal is received by the clk terminal 955, and the input sampler 940 recognizes that the voltage at the positive terminal 645 has crossed the reference voltage which is at ¼ Vdd. Accordingly, the input sampler 940 generates a data output of "1" at the output terminal 980.

Between times T3 and T4 and in response to the "1" at the output terminal 980, first transistor 910 becomes active, and second transistor 925 becomes inactive. The voltage at the positive terminal 945 is raised from ½ Vdd to Vdd as shown by the input signal 985. The reference voltage is changed to ¾ Vdd by the VREF module 930 in response to the "1" at the output terminal 980 as shown by the reference voltage signal 990.

Between times T4 and T5, a voltage lower than Vdd signifying a low signal is received by the positive terminal 945. First transistor 910 is still active, and second transistor 925 is still inactive. Thus, the current flows from Vdd through first transistor 910 and first resistor 915. This lowers the voltage at the positive terminal 945 from Vdd to ½ Vdd as shown by the input signal 985. At time T5, the clock signal is received by the clk terminal 955, and the input sampler 940 recognizes that the voltage at the positive terminal 945 has crossed the reference voltage which is at ¾ Vdd. Accordingly, the input sampler 940 generates a data output of "0" at the output terminal 980.

Between times T5 and T6 and in response to the "0" at the output terminal 980, first transistor 910 becomes inactive, and second transistor 925 becomes active. The voltage at the positive terminal 945 is lowered from ½ Vdd to 0 volts as shown by the input signal 985. The reference voltage is changed by the VREF module 930 from ¾ Vdd to ¼ Vdd in response to the "0" at the output terminal 980 as shown by the reference voltage signal 990.

By utilizing the clock signal to trigger the input sampler 940 to generate an output signal, the termination circuit 900 is synchronously receiving the input signals. By using sampled input signals as determined by the frequency of the clock signal, the output signal at the terminal 980 may have greater accuracy because generation of the output signal is not directly caused by the input signal at terminal 945 crossing the reference voltage on terminal 950.

In an alternate embodiment, the input sampler 940 would not utilize the clk terminal 955 or the clock signal. In this alternate embodiment, the input sampler 940 would continue to monitor the positive terminal 945 for the input signal and compare it with the reference voltage. When the input signal at the positive terminal 945 crosses the reference voltage, the input sampler 940 asynchronously triggers and generates the output signal at the output terminal 980.

Figure 10:
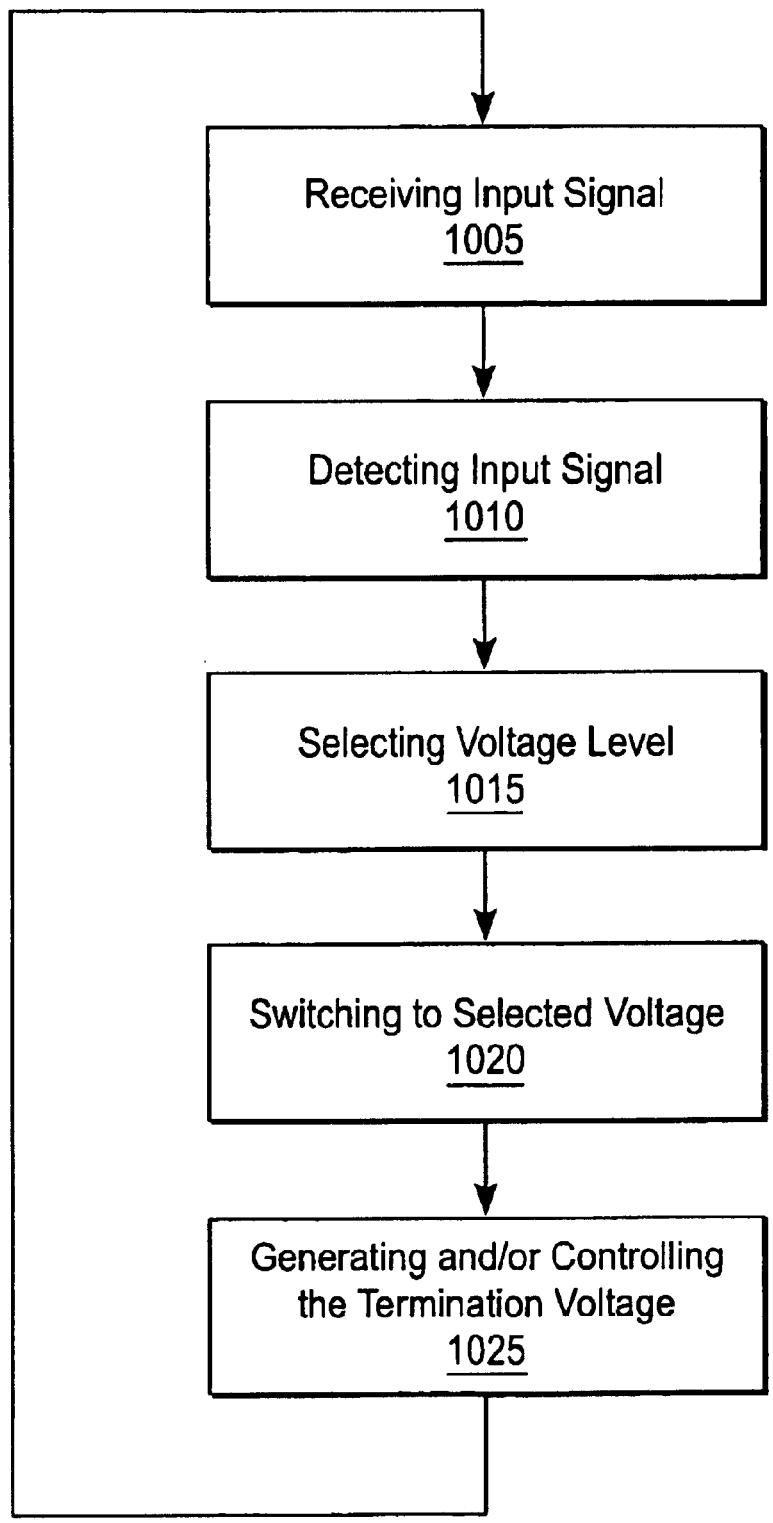
FIG. 10 is a flow diagram of an embodiment of a termination circuit according to the invention.

FIG. 10 illustrates a flow diagram including functional blocks to provide a termination according to one embodiment of the invention. In other embodiments, the functional blocks may occur in a variety of different sequences. Further, additional or fewer functional blocks may be utilized.

Block 1005 represents receiving an input signal through a transmission line. Block 1010 represents the detector switch control block detecting a voltage level of the input signal. Block 1015 represents the detector switch control block selecting an appropriate termination voltage level from a plurality of voltage levels and communicating control signals to the switching block. Block 1020 represents the operation of the switching block to select the voltage level of the termination voltage which will be used for termination the signal. Block 1020 may further represent the switching block operating the various switches as determined by the detector switch control block. Block 1025 represents the termination voltage generating and/or controlling block for generating the appropriate voltage level that is applied to the transmission line through a resistive means such as a resistor, capacitor, inductor, or via a voltage mode impedance controlled output driver.

Figure 11:
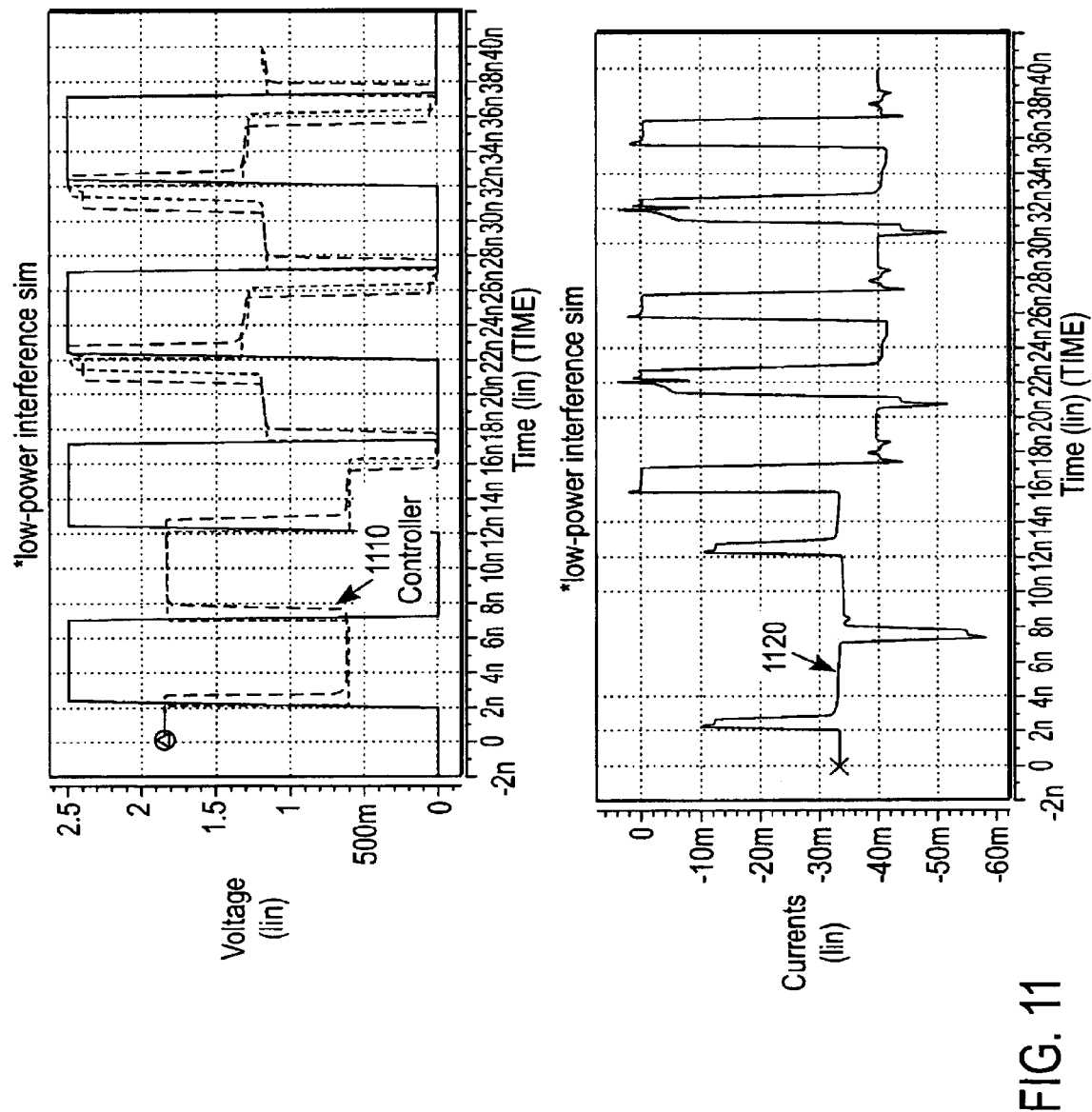
FIG. 11 is a timing diagram illustrating power dissipation within a termination circuit of an embodiment of the invention.

FIG. 11 illustrates an exemplary waveform pattern which corresponds to the operation of a memory controller utilizing termination. This exemplary waveform is shown to better illustrate the invention and is not meant to show exact timing, voltage values, or current values. Input signal 1110 represents the voltage of an input signal received by a memory controller. Current signal 1120 represents the current used by the memory controller. Time is shown in nanoseconds (ns).

The time period from 0 ns to 15 ns illustrates the voltage of the input signal (input signal 1110) without being modified by a termination circuit and the current used by the memory controller (current signal 1120). Within this time period, the current usage does not reach zero regardless of the state of the input signal.

The time period from 16 ns to 40 ns illustrates the voltage of the input signal (input signal 1110) while being modified by a termination circuit and the current used by the memory controller (current signal 1120). Within this time period, the current usage reaches zero for periods when the input signal reaches Vdd (2.5 volts) or 0 volts. Periods of zero current usage represent the times when the active termination circuit terminates the received signal to a voltage close to or the same as the voltage level of the original input signal itself. More power is conserved when each successive bit is the same as the prior bit. For example, power is conserved when there is a string of high input signals. Similarly, power is conserved when there is a string of low input signals. In addition, greater power is conserved as less time elapses between the termination circuit detecting the input signal and generating a voltage level. Because the termination circuit generates a voltage level which corresponds to the voltage level of the input signal, less power is dissipated and thus power is conserved. As the difference between the voltage level generated by the termination circuit and the voltage level of the input signal becomes closer to zero, less power is consumed by the termination circuit.

Within the description and appended claims, specific reference is made to the use of a resistor or a dissipative load, and it is apparent to one skilled in the art that other devices including a capacitor, an inductor, a tuned transistor, and any element, or electrical interconnection, that forms an impedance may replace the resistor or the dissipative load for providing an impedance. Additionally, the resistive element may include a resistor, a capacitor, an inductor, a tuned transistor, and any element that forms an impedance. Specific examples described herein refer to resistors, resistive elements, dissipative loads, or other elements having an impedance value which matches, or substantially matches a characteristic impedance of a transmission line. In alternate embodiments, the termination systems of the presented invention may have resistors, resistive elements, dissipative loads, or other elements that have impedance values that are specifically selected to have impedance values that are greater than or less than the characteristic impedance of the transmission line.

As described, a number of the exemplary termination systems of the present invention are configured to receive a signal having two states. The termination systems of the present invention may, alternatively, be configured to received and adaptively terminate signals having N states by incorporating N termination voltage levels and N corresponding switches.

The foregoing descriptions of specific embodiments of the invention have been presented for purposes of illustration and description. They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications and equivalents as are suited to the particular use.

What is claimed is:

1. A termination system adapted to be coupled to a transmission line comprising:

a termination node having a termination voltage level;

an impedance element coupled to the termination node and adapted to be coupled to the transmission line; and a termination voltage controller coupled to the termination node and adapted to be coupled to the transmission line for detecting a signal voltage level received from the transmission line and for causing the termination voltage level to change from a first voltage level to a second voltage level in response to the signal voltage level, wherein the termination voltage controller is configured to select at least one of the first and second voltage levels from a plurality of voltage levels including two or more voltage levels that differ from ground.

2. The termination system of claim 1, wherein the termination voltage controller further comprises a detector for detecting the signal voltage level.

3. The termination system of claim 2, wherein the detector comprises an input sampler for detecting the signal voltage level.

4. The termination system of claim 2, wherein the termination voltage controller further comprises a switch for causing the termination voltage level to change.

5. The termination system of claim 1, wherein the termination voltage controller further comprises a voltage selector for selecting at least one of the first and second voltage levels from the plurality of voltage levels in response to the signal voltage level.

6. The termination system of claim 5, further comprising a receiver coupled to the impedance element and adapted to be coupled to the transmission line for receiving the signal voltage from the transmission line and a first trace portion coupled between the receiver and the termination node.

7. The termination system of claim 6, further comprising a second trace portion, wherein the first trace portion is coupled to the receiver and the second trace portion is coupled to the termination node.

8. The termination system of claim 7, wherein the impedance element is disposed on the first trace portion.

9. The termination system of claim 1, wherein the transmission line has a characteristic impedance, the impedance element has an impedance, and the impedance of the impedance element substantially matches the characteristic impedance of the transmission line.

10. The termination system of claim 1, wherein the transmission line has a characteristic impedance, the impedance element has an impedance, and the impedance of the impedance element is equal to a portion of the characteristic impedance of the transmission line.

11. The termination system of claim 7, wherein the second trace portion comprises a plurality of second trace portions arranged in parallel.

12. The termination system of claim 11, wherein each of the plurality of second trace portions is coupled to at least one of a plurality of termination nodes.

13. The termination system of claim 12, wherein the impedance element comprises a plurality of impedance elements, and wherein at least one of the impedance elements of the plurality of impedance elements is disposed on each of the plurality of second traces.

14. The termination system of claim 13, wherein the transmission line has a characteristic impedance, each of the plurality of impedance elements has an impedance, and the impedance of each of the impedance elements is equal to a portion of the characteristic impedance of the transmission line.

15. The termination system of claim 13, wherein the transmission line has a characteristic impedance, each of the plurality of impedance elements has an impedance, and the impedance of each of the impedance elements substantially matches the characteristic impedance of the transmission line.

16. The termination system of claim 15, wherein each of the termination nodes is maintained at one of the plurality of voltage levels.

17. The termination system of claim 16, wherein the voltage selector comprises a plurality of switches, wherein one of the switches of the plurality of switches is disposed on each of the plurality of second traces.

18. The termination system of claim 17, wherein the termination voltage controller causes the plurality of switches to cooperatively operate to couple one of the plurality of second trace portions to the termination node maintained at the voltage level that most closely matches the signal voltage level.

19. The termination system of claim 5, wherein the signal voltage level is either a first signal voltage level or a second signal voltage level.

20. The termination system of claim 19, wherein the first signal voltage level represents a first logic state and the second signal voltage level represents a second logic state.

21. The termination system of claim 19, wherein the first voltage level is selected to substantially match the first signal voltage level and the second voltage level is selected to substantially match the second signal voltage level.

22. The termination system of claim 1, wherein the plurality of voltage levels consists of a first voltage level, a second voltage level, a third voltage level and a fourth voltage level.

23. The termination system of claim 22, wherein the signal voltage level equals one of a first signal voltage level, a second signal voltage level, a third signal voltage level and a forth signal voltage level.

24. The termination system of claim 23, wherein the first voltage level is selected to substantially match the first signal voltage level, the second voltage level is selected to substantially match the second signal voltage level, the third voltage level is selected to substantially match the third signal voltage level, the fourth voltage level is selected to substantially match the forth signal voltage level.

25. The termination system of claim 1, further comprising a voltage source configured to supply the selected one of the plurality of voltage levels.

26. The termination system of claim 1, further comprising a plurality of voltage sources configured to supply the plurality of voltage levels.

27. The termination system of claim 1, further comprising a voltage generator configured to generate the plurality of voltage levels.

28. The termination system of claim 1, further comprising a receiver coupled to the impedance element and adapted to be coupled to the transmission line for receiving the signal voltage from the transmission line and a trace coupled between the receiver and the termination node, wherein the impedance element is disposed on the trace.

29. An integrated circuit comprising a first termination system and a first transmission line, wherein the first termination system comprises the termination system of claim 1 and the termination voltage controller receives the signal from the first transmission line.

30. The integrated circuit of claim 29, further comprising a second transmission line and a second termination system, wherein the second termination system comprises another termination system of claim 1.

31. The integrated circuit of claim 29, comprising a bus comprising a plurality of transmission lines and a plurality of termination systems, wherein each of the termination systems comprises the termination system of claim 1 and each of the termination voltage controllers of each of the transmission systems receives a signal from one of the transmission lines of the bus.

32. The integrated circuit of claim 31, wherein the integrated circuit is a memory integrated circuit.

33. The integrated circuit of claim 32, wherein the memory integrated circuit is a memory controller.

34. The integrated circuit of claim 32, wherein the memory integrated circuit is a memory DRAM.

* * * * *